United States Patent

Peiffer et al.

[11] Patent Number: 6,068,936
[45] Date of Patent: *May 30, 2000

[54] POLYOLEFIN FILM CONTAINING CYCLOOLEFIN POLYMER, PROCESS FOR THE PRODUCTION THEREOF, AND THE USE THEREOF

[75] Inventors: Herbert Peiffer, Mainz; Gunter Schlögl, Kelkheim; Thomas Dries, Schwabenheim; Frank Osan, Kelkheim, all of Germany

[73] Assignee: Ticona GmbH, Frankfurt, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/722,976

[22] Filed: Sep. 30, 1996

[30] Foreign Application Priority Data

Sep. 28, 1995 [DE] Germany ............................ 195 36 043

[51] Int. Cl.$^7$ .............................. B32B 27/32; B29C 47/00
[52] U.S. Cl. .......................... 428/500; 428/515; 428/516; 428/519; 428/523; 428/910; 525/210; 264/176.1; 264/173.12; 264/173.16; 156/244.11
[58] Field of Search ..................................... 264/131, 173, 264/173.12, 173.16, 176.1; 427/201, 203; 428/339, 349, 516, 910, 500, 515, 519, 523; 156/244.11; 525/210

[56] References Cited

U.S. PATENT DOCUMENTS

| | | |
|---|---|---|
| 3,937,762 | 2/1976 | Nahmias et al. . |
| 4,147,827 | 4/1979 | Breidt, Jr. et al. ........................ 428/218 |
| 4,197,150 | 4/1980 | Breidt, Jr. et al. ........................ 156/229 |
| 4,203,884 | 5/1980 | Coran et al. . |
| 4,394,235 | 7/1983 | Brandt et al. ............................ 204/165 |
| 4,451,533 | 5/1984 | Wong et al. . |
| 4,622,237 | 11/1986 | Lori . |
| 4,661,389 | 4/1987 | Mudge et al. ........................... 428/210 |
| 4,698,261 | 10/1987 | Bothe et al. . |
| 4,786,533 | 11/1988 | Crass et al. . |
| 4,921,749 | 5/1990 | Bossaert et al. . |
| 4,927,885 | 5/1990 | Hayashida et al. ...................... 525/211 |
| 5,085,943 | 2/1992 | Crighton et al. . |
| 5,087,677 | 2/1992 | Brekner et al. . |
| 5,118,566 | 6/1992 | Wilhelm et al. ......................... 428/339 |
| 5,236,622 | 8/1993 | Yoneda et al. . |
| 5,236,680 | 8/1993 | Nakazawa et al. . |
| 5,246,769 | 9/1993 | Murschall et al. . |
| 5,371,158 | 12/1994 | Brekner et al. . |
| 5,429,862 | 7/1995 | Schuhmann et al. . |
| 5,482,766 | 1/1996 | Mathavan et al. .................... 428/308.4 |
| 5,500,282 | 3/1996 | Heffelfinger et al. ................... 428/339 |
| 5,573,717 | 11/1996 | Peiffer et al. . |
| 5,611,982 | 3/1997 | Mathavan et al. ....................... 264/131 |
| 5,693,414 | 12/1997 | Peiffer et al. ........................... 428/327 |

FOREIGN PATENT DOCUMENTS

| | | |
|---|---|---|
| 0 079 520 | 5/1983 | European Pat. Off. . |
| 0 116 457 | 8/1984 | European Pat. Off. . |
| 0 180 087 | 5/1986 | European Pat. Off. . |
| 0 236 945 | 9/1987 | European Pat. Off. . |
| 0 247 898 | 12/1987 | European Pat. Off. . |
| 0 317 276 | 5/1989 | European Pat. Off. . |
| 0 406 642 | 1/1991 | European Pat. Off. . |
| 0 407 870 | 1/1991 | European Pat. Off. . |
| 0 468 333 | 1/1992 | European Pat. Off. . |
| 0 477 797 | 4/1992 | European Pat. Off. . |
| 0 485 893 | 5/1992 | European Pat. Off. . |
| 109225 | 10/1974 | Germany . |
| 3535472 | 4/1987 | Germany . |
| 3801535 | 7/1988 | Germany . |
| 5-262898 | 10/1993 | Japan . |
| 1 231 861 | 5/1971 | United Kingdom . |

*Primary Examiner*—Marie Yamnitzky

[57] ABSTRACT

A polyolefin film which includes at least one layer containing polyolefin and cycloolefin polymer (COP), where the cycloolefin polymer is amorphous and has a mean molecular weight $M_w$ in the range from 200 to 100,000, and this mean molecular weight $M_w$ of the cycloolefin polymer is at most 50% of the mean molecular weight $M_w$ of the polyolefin, and the cycloolefin polymer is a homopolymer or a copolymer containing at most 20% by weight of comonomer.

20 Claims, 2 Drawing Sheets

6,068,936

POLYOLEFIN FILM CONTAINING CYCLOOLEFIN POLYMER, PROCESS FOR THE PRODUCTION THEREOF, AND THE USE THEREOF

FIELD OF THE INVENTION

The present invention relates to a polyolefin film which includes at least one layer containing a polyolefin and a cycloolefin polymer (COP). The invention furthermore relates to a process for the production of the polyolefin film and to the use of the film.

DESCRIPTION OF THE PRIOR ART

Polyolefin films are employed for many different applications and must be modified, depending on the application, in order to obtain optimum service properties. These desired service properties are, for example, high mechanical strength, good optical properties, good barrier action or good twist properties.

The prior art describes how the mechanical properties, in particular the modulus of elasticity, of biaxially oriented films can be improved. Both process measures and modifications to the film formulation are known. Some documents describe simultaneously modifying the production process and the composition.

Process measures comprise using longitudinal-transverse-longitudinal stretching (three-step stretching) or using the bubble process in combination with longitudinal post-stretching. Documents which report these stretching processes are EP-B-0 116 457 and GB-A-1,231,861.

It is also known to increase the mechanical strength of biaxially oriented films by adding hydrocarbon resins and/or nucleating agents to the olefin homopolymer. Examples thereof are given in U.S. Pat. No. 3,937,762, EP-A-0 406 642 and U.S. Pat. No. 4,921,749. The combination of longitudinal post-stretching stretching and addition of resin is described, for example, in EP-A-0 079 520 and results in a further improvement in mechanical properties of biaxially oriented films.

Disadvantages of process measures are that they greatly increase the production costs and cause problems in the film production. The longitudinal post-stretching is very susceptible to faults in the production process, for example caused by film tears. High resin concentrations likewise result in problems in film production. In particular, deposits form after a short time on the plastification extruder screw and on the longitudinal stretching rolls. Resins in the film increase the migration values, in particular into fats, and the tendency toward blocking at elevated temperature. The addition of nucleating agents in the stated concentrations results in optical defects in the film in the form of "fish eyes" and "bubbles", which are extremely undesired. In addition, reclaim from such films cannot be re-used in the film production process owing to its tendency to agglomerate.

The optical properties of biaxially oriented polypropylene films can be improved by peroxidic degradation of the polypropylene and by using nucleating agents. Corresponding publications in this respect are EP-A-0 477 797 and EP-A-0 406 642. Peroxidic degradation narrows the molecular weight distribution of the polymer, since the long molecular chains in particular are degraded. However, peroxide degradation is also associated with disadvantages. Under certain circumstances, the stretchability of the material can be impaired. In addition, the increased oligomer content entails the risk of the films taking on an undesired taste/odor.

The barrier action of biaxially oriented films with respect to water vapor, oxygen or flavors is significantly improved by coating with PVDC or acrylates. In addition, an improvement in the barrier properties is also achieved by adding hydrocarbon resins to the propylene homopolymer. This is reported in EP-A-0 468 333 and EP-A-0 247 898. The coating of the film is usually carried out off line. This increases the production costs, and in addition the coated films can no longer be reclaimed.

The achievement of good twist properties of biaxially oriented films is described in a number of publications, for example in GB-A-1,231,861, DE-A-35 35 472 and EP-A-0 317 276. In general, low-molecular-weight hydrocarbon resins are added to the propylene homopolymer, and specific process parameters are used.

In order to improve specific film properties, copolymers or ring-opening polymers of cyclic olefins have recently also been employed in addition to hydrocarbon resins.

JP-A-5(=1993)-262 898 describes a biaxially stretched polyolefin-based film comprising (A) from 40 to 98% by weight of a crystalline polyolefin, (B) from 2 to 60% by weight of a cyclic olefin resin which is at least one product from the group consisting of (B-1), (B-2), (B-3) and (B-4), and (C) from 0 to 30% by weight of a hydroalicyclic petroleum resin.

(B-1) is a random ethylene-cyclic olefin copolymer having an ethylene content of from 52 to 90 mol %.

(B-2) is a ring-opening polymer prepared by metathesis polymerization and containing double bonds (at least one double bond per recurring unit).

(B-3) is the hydrogenated form of (B-2).

(B4) is a graft-modified product of (B-1), (B-2) or (B-3).

Films having this composition have the following disadvantages: in the case of (B-1), the high ethylene content impairs the rigidity, optical properties and barrier properties. In the case of (B-2), the double bonds result in low processing stability of the melt, and the polymer tends to crosslink and thus form a gel. In the case of (B-3) and (B4), additional process steps are used, which makes the product more expensive.

A further disadvantage is that these mixtures of crystalline polyolefin and cyclic olefin resin do not form homogeneous mixtures. The crystalline polyolefin forms island structures in the cyclic olefin resin (seas), which means that the film properties, in particular the optical properties and the barrier action, are unsatisfactory.

The object of the present invention was to provide a polyolefin film which is distinguished by high strength values and an improved barrier action to the passage of water vapor and oxygen and in addition can be suitable for twist wrapping. The film should furthermore have increased gloss and improved transparency. At the same time, the other film properties required with respect to the use thereof as a packaging film should not be impaired. The film should have low friction, a low migration behavior, a low tendency to block and good scratch resistance. The disadvantages of the longitudinal post-stretching process, such as technical modifications to the production machine, breakdowns caused by frequent film tears and high residual shrinkage of the BOPP films, should likewise be avoided.

SUMMARY OF THE INVENTION

This object is achieved by a polyolefin film of the generic type mentioned at the outset, wherein the cycloolefin polymer is amorphous and has a mean molecular weight $M_w$ in the range from 200 to 100,000, and this mean molecular weight $M_w$ of the cycloolefin polymer is at most 50% of the mean molecular weight $M_w$ of the polyolefin, and the cycloolefin polymer is a homopolymer or a copolymer containing at most 20% by weight, based on the weight of the polymer, of comonomer.

The novel film has one or more layers. Single-layer embodiments have a structure as for the COP-containing layer described below. Multilayer embodiments have at least two layers and always include the COP-containing layer and at least one further layer, it being possible for the COP-containing layer to form the base layer, the interlayer or the outer layer of the multilayer film. In a preferred embodiment, the COP-containing layer forms the base layer of the film having at least one outer layer, preferably having outer layers on both sides, it being possible, if desired, for interlayers to be present on one or both sides. In a further preferred embodiment, the COP-containing layer forms an interlayer of the multilayer film. Further embodiments with COP-containing interlayers have a five-layer structure and have COP-containing interlayers on both sides. In a further embodiment, the COP-containing layer can form outer layers on one or both sides of the base layer or interlayer. For the purposes of the present invention, the base layer is the layer which makes up more than from 50 to 100%, preferably from 70 to 90%, of the total film thickness. The outer layer is the layer which forms the outermost layer of the film.

Depending on its proposed application, the particular embodiment of the invention can be a transparent film or a non-transparent film. For the purposes of the present invention, the term non-transparent film is taken to mean a film whose light transmission, measured in accordance with ASTM-D 1003-77, is less than 95%, preferably less than 75%. Non-transparent embodiments contain a pigment- and/or vacuole-containing layer in addition to the COP-containing layer. Films having opaque layers of this type are known from the prior art (for example German Patent Application P4301 897.1).

The COP-containing layer of the novel film contains a polyolefin, preferably a propylene polymer, and a COP and, if desired, further additives in effective amounts in each case. In general, this layer contains at least 50% by weight, preferably from 60 to 99% by weight, in particular from 70 to 98% by weight, of polyolefin, based on the weight of the layer. Polyolefins are polymers made from olefins having 2 to 10 carbon atoms, preferably ethylene and/or propylene polymers. Suitable polyolefins generally have a mean molecular weight $M_w$ of from 150,000 to 400,000.

BRIEF DESCRIPTION OF THE DRAWING

FIG. 2a illustrates a film prepared according to this invention in which the cycloolefin/olefin mixture is homogeneous, whereas FIG. 2b illustrates a film lacking homogeneity.

DETAILED DESCRIPTION

Figure 1:
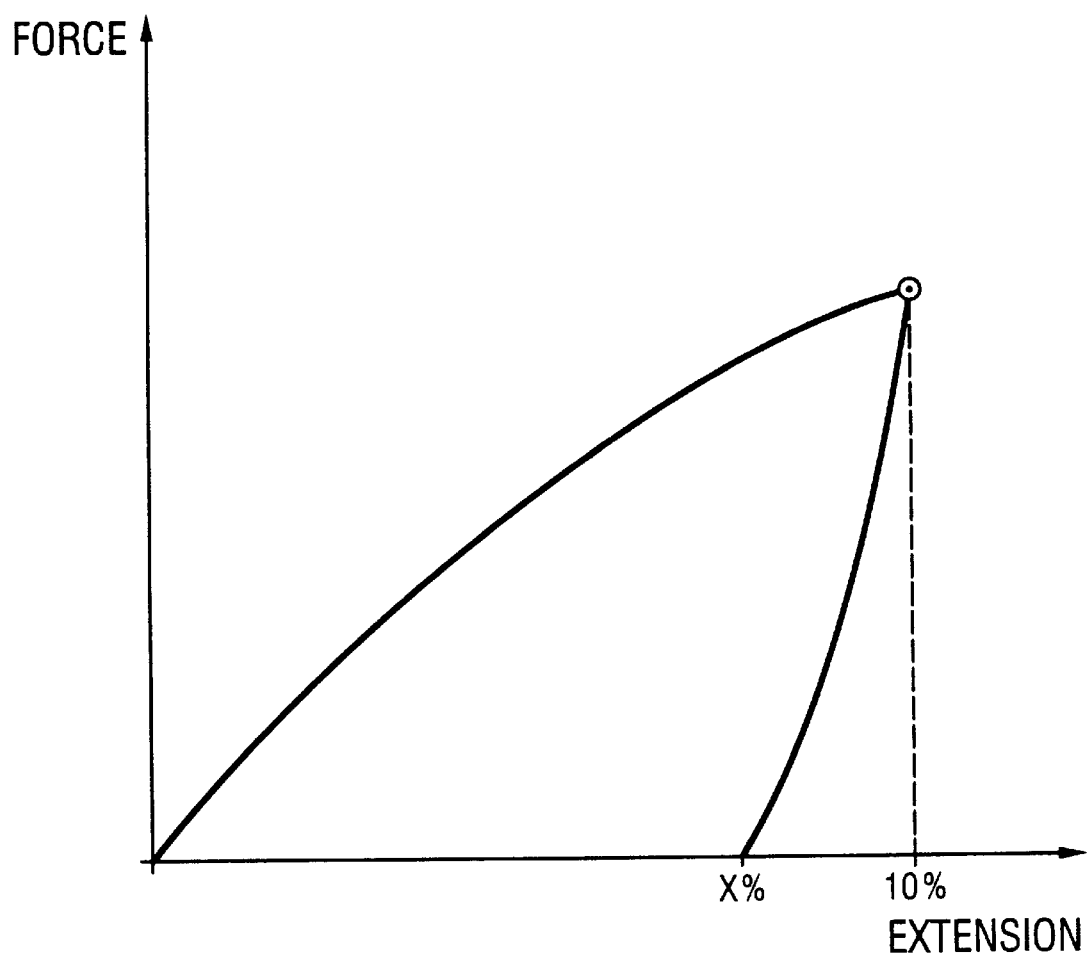
FIG. 1 is graphical plot which is a stress/strain diagram illustrating the residual elongation of a 15×200 mm sample which has been stretched at 20 mm/min (i.e. 10% /min) to a length of 220 mm and then relaxed at the same rate; the residual elongation can be calculated from the X % curve.

A preferred propylene polymer generally contains from 90 to 100% by weight, preferably from 95 to 100% by weight, in particular from 98 to 100% by weight, of propylene units and generally has a melting point of 130° C. or above, preferably from 140 to 170° C., and generally has a melt flow index of from 0.5 g/10 min to 10 g/10 min, preferably from 1.5 g/10 min to 6 g/10 min, at 230° C. and a force of 21.6 N (DIN 53 735). Isotactic propylene homopolymer having an n-heptane-soluble content of from 1 to 15% by weight, copolymers of ethylene and propylene having an ethylene content of 10% by weight or less, copolymers of propylene with $C_4$–$C_8$-α-olefins having an α-olefin content of 10% by weight or less and terpolymers of propylene, ethylene and butylene having an ethylene content of 10% by weight or less and a butylene content of 15% by weight or less are preferred propylene polymers. Isotactic propylene homopolymer having a chain isotacticity index of from 85 to 98%, preferably from 90 to 98%, is particularly preferred. The stated percentages by weight relate to the respective polymer.

Suitable propylene polymers have a mean molecular weight $M_w$ (weight average) in the range from 150,000 to 400,000, preferably from 180,000 to 350,000. The molecular weight distribution of the preferred propylene polymers can vary within broad limits. $M_w/M_n$ is generally from 2 to 15, preferably from 2 to 6, in particular from 3 to 5. Preferred narrow molecular weight distributions can be achieved, for example, by peroxidic degradation of the polymer.

Also suitable is a mixture of said propylene homopolymers and/or copolymers and/or terpolymers and other polyolefins. The mixture contains at least 50% by weight, in particular at least 75% by weight, of propylene polymer, based on the mixture. Suitable other polyolefins in the polymer mixture are, for example, polyethylenes, in particular HDPE, LDPE and LLDPE, where the proportion of these polyolefins is in the range from 50 to 5% by weight, preferably from 10 to 40% by weight, based on the polymer mixture.

In accordance with the invention, the COP-containing layer or the film in the case of single-layer embodiments contains a cycloolefin polymer (COP) in an amount of less than 50% by weight, preferably from 1 to 40% by weight, in particular from 2 to 30% by weight, based on the weight of the layer or based on the weight of the film in the case of single-layer embodiments.

It is essential to the present invention that the cycloolefin polymers are readily compatible with the olefin polymer, preferably polypropylene, and form a homogeneous mixture therewith. Good compatibility is achieved by taking into account two criteria when selecting suitable cycloolefin polymers. Firstly, the mean molecular weight $M_w$ of the COP must be within certain limits, and secondly the $M_w$ of the COP must be in a certain ratio to the $M_w$ of the olefin polymer.

Cycloolefin polymers which are suitable for the purposes of the present invention have a mean molecular weight $M_w$ (weight average) in the range from 200 to 100,000, preferably from 200 to 20,000, in particular from 500 to 10,000. Particularly good compatibility or miscibility of the cycloolefin polymers with the polymer matrix, i.e., in particular, with the polypropylene, is achieved on use of low-molecular-weight cycloolefin polymers having a preferred $M_w$ of from 500 to 5,000.

In addition, it should be ensured for the present invention that the $M_w$ of the cycloolefin polymer is significantly lower than the $M_w$ of the polyolefin or propylene polymer which makes up the further principal constituent in the layer. The $M_w$ of the cycloolefin polymer must be from 0.05 to 50% of the $M_w$ of the polyolefin or propylene polymer. The $M_w$ of the COP is preferably from 0.1 to 30%, in particular from 0.1 to 20%, of the $M_w$ of the polyolefin or polypropylene. The percentage data relates to the higher $M_w$ of the polyolefin.

Surprisingly, mixtures of COP and polyolefin, in particular polypropylene, are homogeneous if COPs having the abovementioned $M_w$ are selected and the mean molecular weights of the two components are matched to one another in the manner described. The films of this composition exhibit significantly improved optical properties compared with COP-containing films of the prior art. The appearance of the film is more homogeneous. Haze is reduced. No optical flaws caused by incompatibility occur.

It has furthermore been found that COPs which are particularly suitable for the invention are essentially amorphous, i.e. have a crystallinity of less than 5% by weight, preferably from 0 to 3% by weight, in particular from 1 to 2% by weight. Furthermore, suitable COPs can be characterized by their glass transition temperature $T_g$, which is generally in the range from 0 to 300° C., preferably in the range from 20 to 200° C.

It has furthermore been found to be particularly advantageous to use in the film cycloolefin polymers whose molecular weight distribution is not excessively broad. The ratio $M_w/M_n$ is preferably from 1 to 5, in particular from 1.5 to 4. Films in accordance with this embodiment of the invention have particularly low migration values and low extractable contents, and the tendency of the film to stick is particularly low.

Cycloolefin polymers (COPs) are homopolymers built up from only one type of cycloolefin, or copolymers built up from cycloolefins and comonomers (COCs), where the comonomer content is at most 20% by weight, based on the weight of the cycloolefin polymer. Cycloolefins are mono- or polyunsaturated polycyclic ring systems, such as cycloalkenes, bicycloalkenes, tricycloalkenes or tetracycloalkenes. The ring systems can be monosubstituted or polysubstituted. Preference is given to cycloolefins of the formulae I, II, III, IV, V or VI below, in which $R^1$, $R^2$, $R^3$, $R^4$, $R^5$, $R^6$, $R^7$ and $R^8$ are identical or different and are a hydrogen atom, a $C_6$–$C_{20}$-aryl or $C_1$–$C_{20}$-alkyl radical or a halogen atom, or a monocyclic olefin of the formula VII, in which n is a number from 2 to 10.

(I)

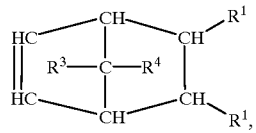

(II)

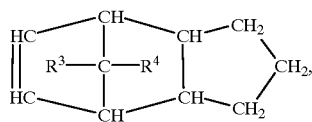

(III)

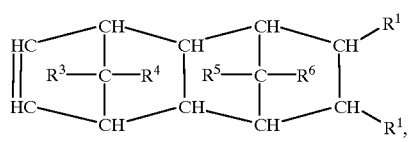

-continued (IV)

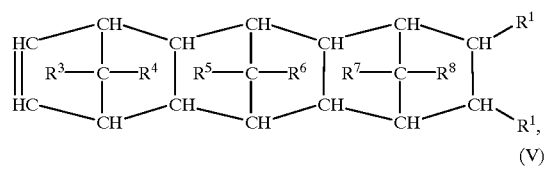

(V)

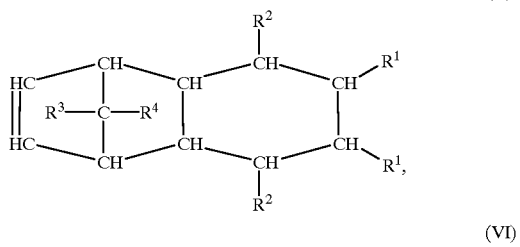

(VI)

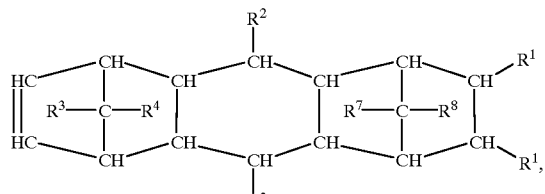

(VII)

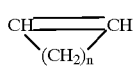

Of the COPs described above, preference is given to those which are built up from monoalkylated or unsubstituted cycloolefins. Particularly preferred cycloolefin homopolymers are polynorbornene, polydimethyloctahydronaphthalene, polycyclopentene and poly(5-methyl) norbornene. The cycloolefin polymers can also be branched. Products of this type can have comb or star structures.

If desired, the above-described cycloolefins can also be copolymerized with small proportions of comonomers. These cycloolefin copolymers (COCs) contain up to 20% by weight, preferably 1–15% by weight, in particular 1–8% by weight, based on the weight of the COC, of comonomer. Preferred comonomers are olefins having 2 to 6 carbon atoms, in particular ethylene and butylene.

The cycloolefin polymers can be prepared with the aid of transition-metal catalysts. Preparation processes are described, for example, in DD-A-109 225, EP-A-0 407 870 and EP-A-0 485 893, which are incorporated herein by way of reference. Molecular weight regulation during the preparation can advantageously be effected using hydrogen. Suitable molecular weights can also be established through targeted selection of the catalyst and reaction conditions. Details in this respect are given in the abovementioned specifications.

The novel multilayer embodiment of the film includes at least one further transparent or non-transparent layer, which can be the base layer, an interlayer or a heat-sealable or non-heat-sealable outer layer of the novel film and is referred to below as the "other" layer.

The other layer generally contains from 75 to 100% by weight, in particular from 90 to 99.5% by weight, of olefinic polymers having 2 to 10 carbon atoms, in each case based on the weight of the other layer, and, if desired, additives in effective amounts in each case.

Examples of olefinic polymers of this type are a propylene homopolymer or a copolymer of
ethylene and propylene or
ethylene and 1-butylene or
propylene and 1-butylene, or a terpolymer of
ethylene and propylene and 1-butylene, or a mixture of two or more of said homopolymers, copolymers and terpolymers, or a blend of two or more of said homopolymers, copolymers and terpolymers, if desired mixed with one or more of said homopolymers, copolymers and terpolymers, particular preference being given to propylene homopolymer or random ethylene-propylene copolymers having an ethylene content of from 1 to 10% by weight, preferably from 2.0 to 8% by weight, or random propylene-1-butylene copolymers having a butylene content of from 2 to 25% by weight, preferably from 4 to 20% by weight, in each case based on the total weight of the copolymer, or random ethylene-propylene-1-butylene terpolymers having an ethylene content of from 1 to 10% by weight, preferably from 2 to 6% by weight, and a 1-butylene content of from 2 to 20% by weight, preferably from 4 to 20% by weight, in each case based on the total weight of the terpolymer, or a blend of an ethylene-propylene-I -butylene terpolymer and a propylene-1-butylene copolymer having an ethylene content of from 0.1 to 7% by weight, a propylene content of from 50 to 90% by weight and a 1-butylene content of from 10 to 40% by weight, in each case based on the total weight of the polymer blend.

The propylene homopolymer employed in the other layer (s) contains from 98 to 100% by weight of propylene units and generally has a melting point of 140° C. or above, preferably from 150 to 170° C., preference being given to isotactic homopolypropylene having an n-heptane-soluble content of 6% by weight or less, based on the isotactic homopolypropylene. The homopolymer generally has a melt flow index of from 1.5 g/10 min to 20 g/10 min, preferably from 2.0 g/10 min to 15 g/10 min. The stated percentages by weight are based on the polymer.

The above-described copolymers and terpolymers employed in the other layer(s) generally have a melt flow index of from 1.5 to 30 g/10 min, preferably from 3 to 15 g/10 min. The melting point is generally in the range from 120 to 140° C. The above-described blend of copolymers and terpolymers generally has a melt flow index of from 5 to 9 g/10 min and a melting point of from 120 to 150° C. All the melt flow indices given above are measured at 230° C. and a force of 21.6 N (DIN 53 735). Other layers of copolymers and/or terpolymers form the outer layer(s) of heat-sealable embodiments of the film.

In a further embodiment, the propylene polymers employed in the COP-containing layer and/or other layers are partially degraded by addition of organic peroxides. A measure of the degree of degradation of the polymer is the so-called degradation factor A, which gives the relative change in the melt flow index in accordance with DIN 53 735 of the polypropylene, relative to the starting polymer.

$A = MFI_2/MFI_1$ $MFI_1$=melt flow index of the propylene polymer before addition of the organic peroxide $MFI_2$=melt flow index of the peroxidically degraded propylene polymer.

The degradation factor A of the propylene polymer is in the range from 3 to 15, preferably from 6 to 10. Particularly preferred organic peroxides are dialkyl peroxides, where the term alkyl radical is taken to mean a conventional saturated straight-chain or branched lower alkyl radical having up to six carbon atoms. Particular preference is given to 2,5-dimethyl-2,5-di(t-butylperoxy)hexane or di-t-butyl peroxide.

The total thickness of the film can vary within broad limits and depends on the intended application. The preferred embodiments of the novel film have total thicknesses of from 4 to 200 μm, preferably from 10 to 100 μm, in particular from 20 to 80 μm. The thickness of any interlayer (s) present is generally in each case, independently of one another, from 0.5 to 15 μm, preferably from 1 to 10 μm, in particular from 2 to 8 μm. The values stated are in each case based on the interlayer. The thickness of the outer layer(s) is chosen independently of other layers and is preferably in the range from 0.1 to 10 μm, in particular from 0.2 to 5 μm, preferably from 0.3 to 2 μm, where outer layers applied to both sides can have identical or different thicknesses and compositions. The thickness of the base layer is given correspondingly by the difference between the total thickness of the film and the thickness of the outer layer(s) and interlayer(s) applied and can therefore vary within broad limits analogously to the total thickness.

In order further to improve certain properties of the novel polyolefin film, both the single-layer film and the COP-containing layer and/or the other layer, i.e. the base layer, the interlayer(s) and/or the outer layer(s), of the multilayer film can contain additives in effective amounts in each case. Preferred additives are polymer-compatible low-molecular-weight hydrocarbon resins and/or preferably antistatics and/or antiblocking agents and/or lubricants and/or stabilizers and/or neutralizers. All amounts given below in percent by weight (% by weight) in each case relate to the layer or layers to which the additive can be added.

Low-molecular-weight resins can be added in order further to improve the desired physical properties (for example film rigidity, shrinkage, optical properties, water vapor permeability (WVP)). It has proven particularly advantageous to add the hydrocarbon resins to the COP layer if this layer forms the base layer. Compatible hydrocarbon resins are low-molecular-weight polymers whose molecular weight $M_w$ is generally in the range from 300 to 8,000, preferably from 400 to 5,000, in particular from 500 to 2,000. The proportion of the resin is in the range from 1 to 30% by weight, preferably from 2 to 30% by weight, based on the weight of the layer. The softening point of the resin is between 60 and 180° C. (measured in accordance with DIN 1995-U4, corresponding to ASTM E-28), preferably from above 100 to 160° C. Of the numerous low-molecular-weight resins, preference is given to hydrocarbon resins, specifically in the form of petroleum resins, styrene resins, cyclopentadiene resins and terpene resins (these resins are described in Ullmanns Encyklopädie der techn. Chemie [Ullmann's Encyclopedia of Industrial Chemistry], 4th Edition, Volume 12, pages 525 to 555). Suitable petroleum resins are described in numerous publications, such as, for example, EP-A-0 180 087, which is expressly incorporated herein by way of reference.

Preferred antistatics are alkali metal alkanesulfonates, polyether-modified, i.e. ethoxylated and/or propoxylated polydiorganosiloxanes (polydialkylsiloxanes, polyalkylphenylsiloxanes and the like) and/or the essentially straight-chain and saturated aliphatic, tertiary amines containing an aliphatic radical having 10 to 20 carbon atoms which are substituted by ω-hydroxy-($C_1$–$C_4$)-alkyl groups, where N,N-bis-(2-hydroxyethyl)alkylamines having 10 to 20 carbon atoms, preferably 12 to 18 carbon atoms, in the alkyl radical are particularly suitable. The effective amount of antistatic is in the range from 0.05 to 0.3% by weight.

The antiblocking agents are preferably added to the outer layers. Suitable antiblocking agents are inorganic additives, such as silicon dioxide, calcium carbonate, magnesium silicate, aluminum silicate, calcium phosphate and the like and/or incompatible organic polymers, such as polyamides, polyesters, polycarbonates and the like, preference being given to benzoguanamine-formaldehyde polymers, silicon dioxide and calcium carbonate. The effective amount of antiblocking agent is in the range from 0.1 to 2% by weight, preferably from 0.1 to 0.5% by weight. The mean particle size is between 1 and 6 μm, in particular 2 and 5 μm, particles having a spherical shape, as described in EP-A-0 236 945 and DE-A-38 01 535, being particularly suitable.

Lubricants are higher aliphatic acid amides, higher aliphatic acid esters, waxes and metal soaps and polydimethylsiloxanes. The effective amount of lubricant is in the range from 0.1 to 3% by weight. The addition of higher aliphatic acid amides in the range from 0.15 to 0.25% by weight to the base layer and/or the outer layers is particularly suitable. A particularly suitable aliphatic acid amide is erucamide. The addition of polydimethylsiloxanes is preferred in the range from 0.3 to 2.0% by weight, in particular polydimethylsiloxanes having a viscosity of from 10,000 to 1,000,000 $mm^2$/s.

Stabilizers which can be employed are the conventional stabilizing compounds for polymers of ethylene, propylene and other α-olefins. The amount in which they are added is between 0.05 and 2% by weight. Phenolic stabilizers, alkali metal/alkaline earth metal stearates and/or alkali metal/alkaline earth metal carbonates are particularly suitable. Phenolic stabilizers are preferred in an amount of from 0.1 to 0.6% by weight, in particular from 0.15 to 0.3% by weight, and with a molar mass of greater than 500 g/mol. Pentaerythrityl tetrakis[3-(3,5-di-tert-butyl-4-hydroxyphenyl)propionate] or 1,3,5-trimethyl-2,4,6-tris(3,5-di-tert-butyl-4-hydroxybenzyl)benzene are particularly advantageous.

Neutralizers are preferably calcium stearate and/or calcium carbonate having a maximum mean particle size of 0.7 μm, an absolute particle size of less than 10 μm and a specific surface area of at least 40 $m^2$/g. In general, the neutralizers are added in an amount of from 0.02 to 0.1% by weight.

The invention furthermore relates to a process for the production of the novel film by the extrusion process, which is known per se. In this process, the polymers or the polymer mixture are compressed and warmed in an extruder, the melts corresponding to the film or the individual layers of the film are subsequently extruded or coextruded through a flat-film die, and the resultant film is taken off over one or more rolls for solidification, oriented if desired, subsequently heat-set and, if desired, corona- or flame-treated on the surface intended for treatment.

It has proven particularly favorable if the take-off roll or rolls on which the extruded film is also cooled and solidified, is kept at a temperature of from 10 to 100° C., preferably from 20 to 70° C., by means of a heating and cooling circuit.

The resultant prefilm is preferably stretched longitudinally and transversely to the extrusion direction, which results in a biaxial orientation of the molecule chains. The biaxial orientation can be carried out simultaneously or successively, where successive biaxial stretching, in which stretching is carried out firstly in the longitudinal direction (in the machine direction) and then in the transverse direction (perpendicular to the machine direction), is particularly favorable. The stretching in the longitudinal direction is preferably at a ratio of from 4:1 to 9:1, preferably from 5.5:1 to 8.5:1, and the stretching in the transverse direction is preferably in the ratio of from 6:1 to 11:1. The longitudinal stretching is expediently carried out with the aid of two rolls running at different speeds in accordance with the target stretching ratio, and the transverse stretching is carried out with the aid of an appropriate tenter frame.

The temperatures at which the longitudinal stretching and the transverse stretching are carried out can vary within a broad range and depend on the particular composition of the layers and on the desired properties of the film. In general, the longitudinal stretching is carried out at from 80 to 150° C., preferably from 100 to 140° C., and the transverse stretching is carried out at from 120 to 170° C., preferably from 150 to 160° C.

The biaxial stretching of the film is followed by heat-setting (heat treatment) thereof, during which the film is kept at a temperature of from 100 to 160° C., preferably from 110 to 130° C., or from about 0.1 to 10 seconds. The film is subsequently wound up in a conventional manner using a wind-up unit.

As mentioned above, the biaxial stretching is preferably followed by corona- or flame-treatment of one or both surfaces of the film by known methods. The treatment intensities are within conventional limits, preferably from 37 to 50 mN/m, in particular from 39 to 45 mN/m. For flame treatment with a polarized flame (cf. U.S. Pat. No. 4,622,237), a direct electric voltage is applied between a burner (negative pole) and a chill roll. The level of the applied voltage is between 500 and 3,000 V, preferably in the range from 1,500 to 2,000 V. Owing to the applied voltage, the ionized atoms attain increased acceleration and hit the polymer surface with greater kinetic energy. The chemical bonds within the polymer molecule are broken more easily, and free-radical formation proceeds more quickly. The thermal load on the polymer here is much less than in the case of standard flame treatment, and films can be obtained in which the heat-sealing properties of the treated side are even better than those of the untreated side.

For the alternative corona treatment, the film is passed between two conductor elements serving as electrodes, with such a high voltage, usually an alternating voltage (about 10,000 V and 10,000 Hz) being applied between the electrodes that spray or corona discharges can occur. Owing to the spray or corona discharge, the air above the film surface is ionized and reacts with the molecules of the film surface, so that polar inclusions in the essentially nonpolar polymer matrix are produced.

The cycloolefin polymers are incorporated into the film either as pure granules or as granulated concentrate (masterbatch) by premixing the polyolefin granules or powder with the cycloolefin polymer or the COP masterbatch and subsequently feeding the premix to the extruder. In the extruder, the components are mixed further and warmed to the processing temperature. It is essential to the novel process that the extrusion temperature is above the glass transition temperature $T_g$ of the cycloolefin polymer. In general, the extrusion temperature is at least 5° C., preferably from 10 to 180° C., in particular from 15 to 150° C., above the $T_g$ of the cycloolefin polymer.

The novel film is distinguished by excellent mechanical strengths. The modulus of elasticity of the film in the longitudinal direction is greater than 2,200 N/mm², preferably greater than 2,400 N/mm², and that in the transverse direction is greater than 4,000 N/mm², preferably greater than 4,200 N/mm². Surprisingly, the novel films, even with a thickness of less than 20 μm, are still sufficiently rigid to be processed on modern high-speed packaging machines. This film therefore makes it possible further to reduce the plastic content of packaging without impairing the quality of the packaging. The films are furthermore distinguished by significantly improved barrier properties, in particular to water vapor and oxygen.

The invention is now illustrated in greater detail with reference to working examples.

EXAMPLE 1

A transparent three-layer film having a symmetrical structure and a total thickness of 20 μm was produced by coextrusion followed by stepwise orientation in the longitudinal and transverse directions. The outer layers each had a thickness of 0.6 μm.

Base layer A (=COP-containing layer):

| | |
|---|---|
| 94.85% by weight | of isotactic polypropylene from Solvay with the trade name ®Eltex PHP 405 ($M_w$ = 250,000) |
| 5.0% by weight | of norbornene homopolymer having a glass transition temperature of 184° C. and a mean molecular weight $M_w$ of 3,000 |
| 0.15% by weight | of N,N-bisethoxyalkylamine |

The $M_w$ of the norbornene homopolymer is 1.2% of the $M_w$ of Eltex PHP 405. Outer layers B:

| | |
|---|---|
| 98.77% by weight | of random ethylene-propylene copolymer having a $C_2$ content of 4.5% by weight |
| 0.33% by weight | of $SiO_2$ as antiblocking agent having a mean particle size of 2 μm |
| 0.90% by weight | of polydimethylsiloxane having a viscosity of 30,000 mm²/s |

The production conditions in the individual process steps were as follows:

| | | | |
|---|---|---|---|
| Extrusion: | Temperatures | Layer A: | 280° C. |
| | | Layers B: | 280° C. |
| | Temperature of the take-off roll: | | 30° C. |
| Longitudinal stretching: | Temperature: | | 130° C. |
| | Longitudinal stretching ratio: | | 5.0 |
| Transverse stretching: | Temperature: | | 160° C. |
| | Transverse stretching ratio: | | 10.0 |
| Heat-setting: | Temperature: | | 140° C. |
| | Convergence: | | 15% |

EXAMPLE 2

Compared with Example 1, only the concentration of the norbornene homopolymer was altered from 5 to 10% by weight in the base layer. Correspondingly, the base layer contained only 89.85% by weight of polypropylene.

EXAMPLE 3

Compared with Example 1, the concentration of the norbornene homopolymer was changed from 5 to 25% by weight in the base layer. Correspondingly, the base layer contained only 74.85% by weight of polypropylene. The production conditions in the individual process steps were now as follows:

| | | | |
|---|---|---|---|
| Extrusion: | Temperatures | Layer A: | 260° C. |
| | | Layers B: | 260° C. |
| | Temperature of the take-off roll: | | 30° C. |
| Longitudinal stretching: | Temperature: | | 130° C. |
| | Longitudinal stretching ratio: | | 6.5 |
| Transverse stretching: | Temperature: | | 155° C. |
| | Transverse stretching ratio: | | 8.0 |
| Heat-setting: | Temperature: | | 140° C. |
| | Convergence: | | 15% |

The film has excellent twist properties.

Comparative Example 1

Compared with Example 1, the concentration of the norbornene homopolymer was changed from 5 to 0% by weight in the base layer. Correspondingly, the base layer contained 99.85% by weight of polypropylene and now no norbornene homopolymer.

Comparative Example 2

Compared with Example 1, a random ethylene-cyclic olefin copolymer having an ethylene content of 60 mol % was used ((B-1), JP-A-5(=1993)-262 898). The concentration of the olefin copolymer was not changed. Correspondingly, the base layer still contained 94.85% by weight of polypropylene. The olefin copolymer does not form a homogeneous mixture with the propylene homopolymer, and consequently in particular the optical properties of the film are impaired.

Comparative Example 3

Compared with Example 3, only the concentration of the norbornene homopolymer was changed from 25 to 0% by weight in the base layer. The film has lost its good twist properties.

The properties of the films described in the examples and comparative examples are listed in the attached table.

In order to characterize the raw materials and films, the following measurement methods were used:

Melt Flow Index

The melt flow index was measured in accordance with DIN 53 735 at 230° C. and under a load of 21.6 N.

Melting Point

DSC measurement, maximum of the melting curve, heating rate 20° C./min.

Gloss

The gloss was determined in accordance with DIN 67 530. The reflector value was measured as an optical characteristic of the surface of a film. In accordance with the standards ASTM-D 523-78 and ISO 2813, the angle of incidence was set at 60° or 85°. A light beam hits the planar test surface at the set angle of incidence and is reflected or scattered thereby. The light beams hitting the photoelectronic receiver are indicated as a proportional electrical quantity. The measurement value is dimensionless and must be given together with the angle of incidence.

Crystallinity

Crystallinity was determined with the aid of X-ray methods. The corrected diffracted X-ray intensities were set proportional to the proportions of the amorphous and crystalline phases.

Glass Transition Temperature

The samples were analyzed with the aid of DSC (differential scanning calorimetry). The heating rate was 20 K/min. In order to eliminate the previous thermal history in the sample, the sample was first heated in the DSC instrument to above the glass transition temperature $T_g$, cooled quickly and then reheated (second heating). The temperature for the glass transition was taken from the thermogram for the second heating as half the step height.

Vicat Softening Temperature

The vicat softening temperature VST/B/120 was measured in accordance with ISO 306, DIN 53 460.

Water Vapor and Oxygen Permeability

The water vapor permeability is determined in accordance with DIN 53 122 Part 2. The oxygen barrier action is determined in accordance with draft DIN 53 380 Part 3 at an atmospheric humidity level of 53%.

Haze

The haze of the film was measured in accordance with ASTM-D 1003-52.

Surface Tension

The surface tension was determined by the ink method (DIN 53 364).

Printability

The corona-treated films were printed 14 days after production (short-term assessment) and 6 months after production (long-term assessment). The ink adhesion was assessed by means of an adhesive tape test. If little ink was removable by means of adhesive tape, the ink adhesion was assessed as moderate and if a significant amount of ink was removable, the ink adhesion was assessed as poor.

Determination of the Blocking Behavior at Elevated Temperature

In order to measure the blocking behavior at elevated temperature, two wooden blocks measuring 72 mm×41 mm×13 mm to which felt was bonded on one side are wrapped in the film to be measured and heat-sealed. A weight of 200 g is placed on the wooden blocks, which are placed with the felt pads facing one another, and this structure is placed in a heating oven preheated to 70° C. and left there for 2 hours. The arrangement is then cooled to room temperature (21° C.) for 30 minutes, the weight was removed, and the upper block is pulled down from the lower block by means of a mechanical apparatus. The evaluation is carried out over 4 individual measurements, via which a maximum push-off force (measured in N) is then determined. The specification is satisfied if none of the individual measurements is greater than 5 N.

Molecular Weight Determination

The mean molecular weight $M_w$ (weight average) given in the description, tables and claims refers to the weight average molecular weight. In order to determine the mean molecular weight $M_w$, three-detector gel permeation chromatography is used (0.1% by weight solution, 135° C., solvent orthodichlorobenzene, PE standard). Detection is carried out by UV absorption spectroscopy at various wavelengths and by means of refractive index and light scattering power of the fractions. The calibration is carried out via a standard compound of known molecular weight. The comparison of the UV absorption of the standard substance with the absorption of the sample enables the assignment of molecular weights (DIN 55 672 Part 1).

Tear Strength and Elongation at Break

The tear strength and elongation at break are determined in accordance With DIN 53 455.

Modulus of Elasticity

The modulus of elasticity is determined in accordance with DIN 53 457 or ASTM 882.

DETAILED DESCRIPTION OF THE DRAWINGS

Residual Elongation

A film strip with a width of 15 mm was cut out of the film transversely to the machine direction and clamped in a tensile testing machine, with the clamped length being 200 mm. The sample was then stretched at 20 mm/min, corresponding to 10% /min. After an elongation of 10%, i.e. at a sample length of 220 mm, the sample was automatically relaxed at the same rate. The determination of the residual elongation from the stress/strain diagram is shown diagrammatically in the FIG. 1 of the drawing. The residual elongation ("$D_b$"="bleibende Dehnung") is calculated from $$D_b = X\%/10\% * 100\%.$$

where X % is a percentage determined by $(L_2-L_1)/L_1 \times 100$, where $L_1$ is the original length before the 10% elongation, and $L_2$ is the length of the film after relaxation. Thus, the "residual elongation" ($D_b$) is a comparison of X % to 10%, as shown in FIG. 1 of the Drawing.

Assessment of Miscibility

Figure 2A:
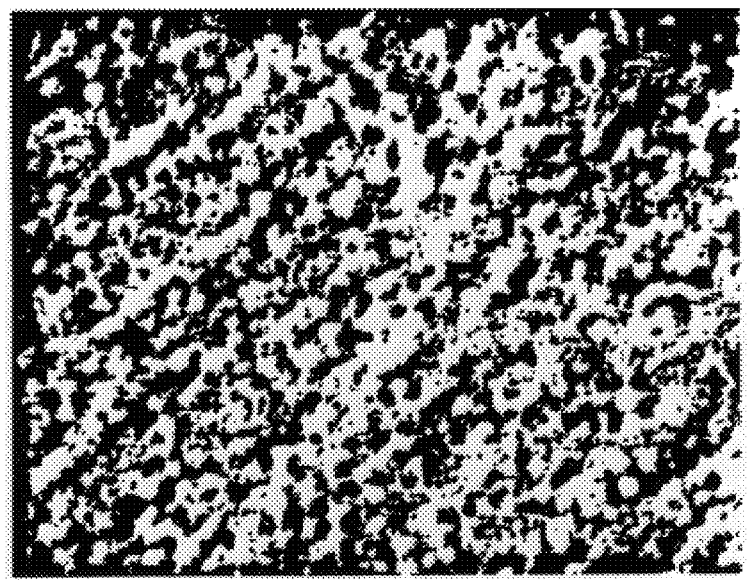
FIG. 2a and FIG. 2b are full-tone light photomicrographs of 10 μm-thick samples cut from unoriented films containing cycloolefin polymer mixed with olefin polymer.
Figure 2B:
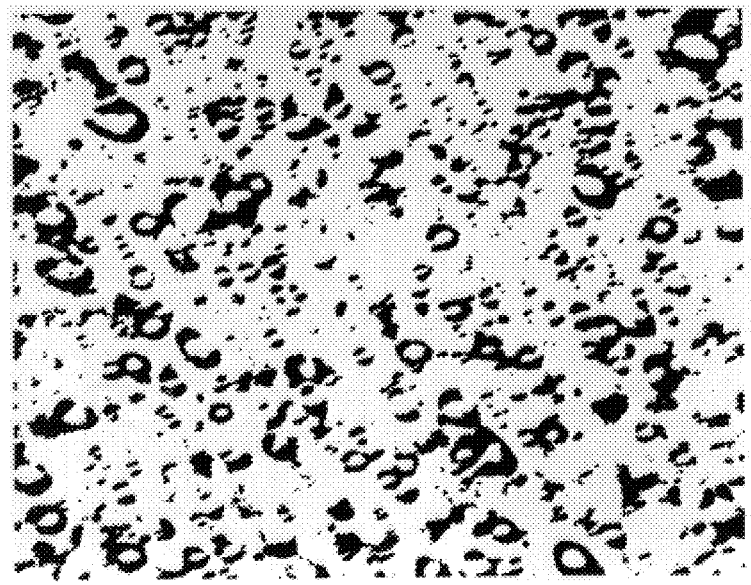

The miscibility between the COP and the olefin polymer is assessed with the aid of light photomicrographs. To this end, an approximately 10 μm thick piece is cut out of the film perpendicular to the surface. A light photomicrograph of this section (microtome) is prepared in transmitted light. If a structure as shown in FIG. 2a is evident, a homogeneous mixture is present. If, by contrast, a structure as shown in FIG. 2b forms, there is no homogeneous mixture present (islands and seas). The microtome section is expediently carried out on the unoriented film.

|    | COC content in base % by weight | λ*λq | Modulus of elasticity long./transv. N/mm² | Water vapor barrier g/m²d | Gloss | Haze % | Residual elongation long./transv. % |
|----|---|---|---|---|---|---|---|
| E1 | 5 | 5*10 | 2700/4500 | 1.15 | 125 | 1.5 | — |
| E2 | 10 | 5*10 | 2900/4700 | 0.93 | 130 | 1.5 | — |
| E3 | 25 | 6.5*8.0 | 3300/3900 | — | 130 | 1.5 | 74/70 |

-continued

|  | COC content in base % by weight | $\lambda * \lambda q$ | Modulus of elasticity long./transv. N/mm$^2$ | Water vapor barrier g/m$^2$d | Gloss | Haze % | Residual elongation long./transv. % |
|---|---|---|---|---|---|---|---|
| CE1 | 0 | 5*10 | 2100/4200 | 1.4 | 115 | 3 | — |
| CE2 | 5 | 5*10 | 2200/4150 | 1.35 | 100 | 3.5 | — |
| CE3 | 0 | 6.5*8.0 | 2200/4000 | 1.4 | 115 | 2.5 | 52/42 |

We claim:

1. A film structure comprising a major amount of olefinic polymer which includes at least one mixed-polymer layer containing a non-cyclic polyolefin, hereafter referred to as a polyolefin, and a cycloolefin polymer, hereafter referred to as a COP, the polymer composition of said mixed-polymer layer being essentially homogeneous and comprising, based on the weight of said layer:

at least 50% by weight of polyolefin, and a polyolefin-compatible amount, which is less than 50% by weight, of COP, wherein said COP is essentially amorphous and has a mean molecular weight, $M_w$, in the range from 200 to 100,000, and the $M_w$ of the COP ranges from 0.05 to at most 50% of the $M_w$ of said polyolef in, said COP containing up to 20% by weight of comonomer.

2. A film structure as claimed in claim 1, wherein the mixed-polymer layer contains, based on the weight of said layer, from 60 to 99% by weight of a polyolefin and from 1 to 40% by weight of a COP.

3. A film structure as claimed in claim 1, wherein, in said mixed-polymer layer, the $M_w$ of the polyolefin ranges from 150,000 to 400,000.

4. A film structure as claimed in claim 1, wherein, in said mixed-polymer layer, the polyolefin has a molecular weight distribution, $M_w/M_n$, which is in the range from about 2 to about 15.

5. A film structure as claimed in claim 1, wherein, in said mixed-polymer layer, the $M_w$ of the COP is from 200 to 20,000.

6. A film structure as claimed in claim 1, wherein, in said mixed-polymer layer, the COP has a molecular weight distribution, $M_w/M_n$, which is in the range from 1 to 5.

7. A film structure as claimed in claim 1, wherein, in said mixed-polymer layer, the COP is polynorbornene, polydimethyloctahydronaphthalene, polycyclopentene or poly(5-methyl)norbornene.

8. A film structure as claimed in claim 1, wherein the film structure comprises a plurality of layers including a further layer which is essentially transparent, and the film structure has a haze, measured in accordance with ASTM-D 1003-52, of less than 3.0.

9. A film structure as claimed in claim 8, wherein said further layer contains from 75 to 100% by weight of an α-olefinic polymer.

10. A film structure as claimed in claim 1, wherein the film structure comprises a plurality of layers including a further layer which is essentially opaque, and the film structure has a light transparency of less than 95%, measured in accordance with ASTM-D 1003-77.

11. A film structure as claimed in claim 10, wherein said further layer contains, based on the weight of the layer, from 1 to 25% by weight of vacuole-initiating filler or pigment or a mixture of said filler and said pigment.

12. A film structure as claimed in claim 1, wherein the polyolefin of said mixed-polymer layer is a propylene polymer having a molecular weight distribution, $M_w/M_n$, of about 2 to about 6.

13. A film structure as claimed in claim 1, wherein the film structure comprises a plurality of layers, and the layers other than said mixed-polymer layer comprise at least 75% of an olefinic polymer having 2 to 10 carbon atoms in the olefinic monomer.

14. A polyolefin film as claimed in claim 1, wherein the polyolefin of said mixed-polymer layer comprises a propylene polymer.

15. A polyolefin film structure as claimed in claim 14, wherein said propylene polymer has been peroxidically degraded.

16. A polyolefin film structure as claimed in claim 1, wherein said mixed-polymer layer is the sole layer of said film structure.

17. A polyolefin film structure as claimed in claim 1, wherein the film structure has been oriented, at least mono-axially.

18. A packaging material, twist-wrap film, barrier film, laminated film, or printed film comprising the film structure as claimed in claim 1.

19. A packaging material comprising a film structure as claimed in claim 1.

20. A process for the production of a film structure, comprising preparing at least one polymeric mixture comprising, for each 100 parts by weight of polymer, at least 50 parts by weight of polyolefin, and a polyolefin-compatible amount, not exceeding 50 parts by weight, of cycloolefin polymer, hereafter COP, wherein said COP is essentially amorphous and has a mean molecular weight, $M_w$, in the range from 200 to 100,000, and the $M_w$ of the COP ranges from 0.05 to at most 50% of the $M_w$ of said polyolefin, said COP containing up to 20% by weight of comonomer, and wherein the resulting polymeric mixture is essentially homogeneous, compressing and warming the resulting polymeric mixture in an extruder to form a melt, extruding said melt through a flat-film die, alone or in combination with at least one additional melt, to obtain a film structure, wherein said extruding step is carried out at a temperature above the glass transition temperature of the COP, taking off the resulting film structure over at least one roll, said film structure being essentially free of optical flaws caused by incompatibility, optionally orienting said resulting film structure, and optionally heat-setting and surface-treating said resulting film structure.

* * * * *